United States Patent [19]
Mizutani et al.

[11] Patent Number: 5,979,883
[45] Date of Patent: Nov. 9, 1999

[54] LIQUID ENCLOSING TYPE VIBRATION ISOLATING MOUNT

[75] Inventors: Yutaka Mizutani; Motoo Kunihiro, both of Osaka, Japan

[73] Assignee: Toyo Tire & Rubber Co., Ltd., Osaka, Japan

[21] Appl. No.: 09/007,847

[22] Filed: Jan. 15, 1998

Related U.S. Application Data

[62] Division of application No. 08/783,492, Jan. 14, 1997.

[30] Foreign Application Priority Data

Jan. 24, 1996 [JP] Japan ..................................... 8-10022
Mar. 11, 1996 [JP] Japan ..................................... 8-53051

[51] Int. Cl.$^6$ .............................. F16F 5/00; B60G 13/00
[52] U.S. Cl. ...................................... 267/140.13; 267/219
[58] Field of Search ........................... 267/140.13, 140.3, 267/141, 141.2, 219, 220; 248/562, 636

[56] References Cited

U.S. PATENT DOCUMENTS

| | | | |
|---|---|---|---|
| 4,418,895 | 12/1983 | Bertin et al. ..................... | 267/140.13 |
| 4,787,610 | 11/1988 | Kojima et al. .................... | 267/140.13 |
| 5,205,546 | 4/1993 | Schisler et al. .................. | 267/140.13 |
| 5,667,205 | 9/1997 | Mutoh et al. ..................... | 267/140.13 |
| 5,704,598 | 1/1998 | Kojima ........................... | 267/140.13 |
| 5,707,047 | 1/1998 | Meyering et al. .................. | 267/140.13 |

*Primary Examiner*—Robert J. Oberleitner
*Assistant Examiner*—Jeffrey Woller
*Attorney, Agent, or Firm*—Jordan and Hamburg LLP

[57] ABSTRACT

A liquid filled vibration isolating mount has a rigid tubular fitting defining an interior fitting cavity, an upper opening and a lower opening. A vibration isolating base body formed of elastic material is fitted in the upper opening of the rigid tubular fitting. A diaphragm seals the lower opening of the rigid tubular fitting and a partition is disposed in the interior fitting cavity of the rigid tubular fitting between the vibration isolating base body and the diaphragm to divide the interior fitting cavity into a first liquid chamber and a second liquid chamber. The first liquid chamber has a first liquid chamber wall formed at least in part by the vibration isolating base body, the partition and the rigid tubular fitting. The second liquid chamber has a second liquid chamber wall formed at least in part by the diaphragm and the partition. The partition defines an orifice communicating the first and the second liquid chambers with each other. The rigid tubular fitting forms at least a portion of a side wall of the first liquid chamber wall and defines at least one opening in the side wall. An elastic membrane cup covers each of the at least one side wall opening and has a convex surface projecting into the first liquid chamber and a concave surface defining an air chamber separated from the first liquid chamber by the elastic membrane cup and extending into the interior fitting cavity. The air chamber may be sealed or open to the atmosphere.

18 Claims, 17 Drawing Sheets

5,979,883

LIQUID ENCLOSING TYPE VIBRATION ISOLATING MOUNT

This is a division, of application Ser. No. 08/783,492, filed Jan. 14, 1997.

BACKGROUND OF THE INVENTION

The present invention relates to a liquid enclosing type vibration isolating mount used mainly in supporting a vibration generating body such as an automobile engine.

There has been known a liquid enclosing type vibration isolating mount as a vibration isolating mount supporting a vibration generating body such as an automobile engine to prevent the vibration from transmitting to a vehicle body. An attenuating function for a low frequency vibration is assigned to a liquid enclosed in a volume variable liquid chamber while a vibration isolating function for a high frequency vibration is assigned to a vibration isolating base body comprising a rubber elastic body forming a portion of a chamber wall for enclosing the liquid.

The following liquid enclosing type vibration isolating mount of a first type is known.

Normally, two metal fittings on the side of an engine and on the side of a body frame are coupled via an elastic base body comprising a ring-like rubber elastic body, a partition and a diaphragm comprising a rubber membrane attached to the side of one of the metal fittings in a sealed state. A first liquid chamber, where the vibration isolating base body constitute a portion of a chamber wall, and a second chamber where a diaphragm constitutes a portion of a chamber wall, are partitioned by the partition and the chambers are communicated with each other by an orifice in the partition by which the vibration attenuating function and the vibration isolating function are achieved by a liquid flow effect of the chambers owing to the orifice and a vibration isolating effect of the vibration isolating base body.

According to the liquid enclosing type vibration isolating mount, there has been proposed a mount in which a high attenuating effect is achieved in respect to a large amplitude of vibration and in the case of a small amplitude of vibration at a high frequency region. To effect a reduction in muffled sound or transmitting sound or the like, a rubber membrane is provided to the metal fitting on the side of the first liquid chamber where the vibration isolating body constitute a portion of the wall chamber, so as to form a vacant chamber communicating with outside air (for example, Japanese Unexamined Utility Model Publication No. JU-A-4-97136) (refer to FIG. 18).

However, the proposed rubber membrane is formed in a simple flat plate shape, constituting a wall face flush with the metal fitting in respect of the first liquid chamber, a region effective in reducing the dynamic spring constant is narrow since the surface area is small and a resonance phenomenon of the liquid in the high frequency region occurs at a comparatively low frequency resign (normally around 350 Hz). Therefore, the dynamic spring constant is increased in the frequency region by which transmittance of noise is increased.

Especially, although a more or less effect is achieved in reducing the dynamic spring constant up to around 400 Hz, the effect of reducing the dynamic spring constant is extremely lowered in the high frequency region exceeding 400 Hz and muffled sound at high-speed running is conspicuous (refer to Comparative Example 1 in FIG. 10).

A liquid enclosing type vibration isolating mount of a second type is known. There is provided a liquid enclosing type vibration isolating mount of a dual chamber type, for example, as illustrated in FIG. 19, where a vibration isolating base body 253, comprising a rubber elastic body, is attached to one opening of a metal cylinder 252 and a diaphragm 254, comprising a rubber membrane, and a partition 255 are attached to the other opening thereof respectively in a sealed state. An inner chamber of the metal cylinder 252 is partitioned into a first liquid chamber, where the vibration isolating base body 253 constitutes a portion of the chamber wall, and a second liquid chamber 258 where the diaphragm 254 constitutes a portion of the chamber wall as does the partition 255. Both liquid chambers are communicated with each other by an orifice 256 provided in the partition 255 whereby the vibration attenuating function and the vibration isolating function are achieved by a liquid flow effect of the orifice and a vibration isolating effect of the vibration isolating base body. Numeral 251 designates a main body metal fitting in a cylindrical shape and numeral 259 designates a metal fitting for fixing.

With respect to the frequency characteristic of such a vibration isolating mount, as illustrated in Comparative Example 2 in FIG. 17, the dynamic spring constant is high as a whole and engine noise, such as muffles sound or transmitting sound or the like, of an engine at high-speed running is significant.

Further, with respect to the above-described liquid enclosing type vibration isolating mount of a dual chamber type, it has been conceived that in order to reduce the engine noise, a rubber membrane 260 in a flat plate shape is provided at the central portion of the partition 255 as shown by FIG. 20. However, the region effective in reducing the dynamic spring constant is narrow and since the surface area of the rubber membrane 260 is small, resonance phenomenon of a liquid at a high frequency region occurs at a comparatively low frequency region (normally around 350 Hz) and the dynamic spring constant in the vicinity of 350 Hz is increased, as shown by Comparative Example 3 of FIG. 17, resulting in the transmittance of noise of an engine, or the like, being increased in this frequency region.

Also, Japanese Unexamined Utility Model Publication No. JU-A-4-97136 proposes to provide a rubber membrane on the side of the first liquid chamber where the vibration isolating base body constitutes a portion of the chamber wall so as to form a vacant chamber communicating with outside air in a liquid enclosing type vibration isolating mount of the dual chambers type. However, problems similar to those in the vibration isolating mount in FIG. 20 result.

The present invention has been carried out in view of the above-described problems and it is an object of the present invention to provide a liquid enclosing type vibration isolating mount capable of significantly reducing the dynamic spring constant over a wide frequency range, which is excellent for reducing muffled sound or transmitted sound when an automobile or the like runs at a high speed.

SUMMARY OF THE INVENTION

According to a first embodiment of the invention, there is provided a liquid enclosing type vibration isolating mount in which upper and lower metal fittings, for fixing a vibration isolating mount to a supporting body and a supported body, are connected respectively to an upper face and a lower face of a rubber vibration isolating base body having a ring-like shape or a shape of a thick-wall short cylinder, a partition and a diaphragm is attached to the upper metal fitting, a first liquid chamber defined by a center hole of the rubber vibration isolating base body and for which the vibration isolating base body forms a portion of a chamber wall, a second liquid chamber partitioned from the first liquid chamber by the partition and defined by the diaphragm which forms a portion of a chamber wall of the second liquid chamber, the liquid chambers are communicated to each other by an orifice, wherein a rubber elastic membrane is connected to the lower metal fitting and forms a portion of the chamber wall of the first liquid chamber, the rubber elastic membrane is projected in an inversed cup shape from a lower end face of the first liquid chamber into the first liquid chamber and an air chamber is formed at an inner side of the rubber elastic membrane.

According to the liquid enclosing type vibration isolating mount, the surface area of the rubber membrane on the inner face of the liquid chamber is larger than that in the case where the rubber elastic membrane is formed in a flat plate shape and the dynamic spring constant in the high frequency region is reduced over a wide range by an effect caused by vibration of the rubber elastic membrane. Especially, the dynamic spring constant is reduced over a wide range in the high frequency region exceeding 400 Hz whereby muffled sound in high-speed running is reduced.

It is preferable in the above-described mount that the height (B) of the rubber elastic membrane in a reversed cup shape is 20% or more of an interval (A) between the metal fitting on the side of the first liquid chamber and the partition or more.

That is, when the height of the rubber elastic membrane in a reversed cup shape is lower than 20% of the interval, the effect of the projected shape is diminished. Further, although the height of the rubber elastic membrane in the reversed cup shape differs depending on the elastic force of the vibration isolating base body, an amount of liquid inside of the chamber or the like, it is preferable that the rubber elastic membrane is not brought into contact with the partition and does not interfere therewith even if the vibration isolating base body is elastically deformed by vibration.

Incidentally, the air chamber may be communicated with outside air or may constitute a sealed air chamber.

According to a second embodiment of the invention, there is provided a liquid enclosing type vibration isolating mount in which an upper opening portion of a cylindrical metal fitting is closed by a vibration isolating base body comprising a rubber elastic base body, a lower opening portion thereof is closed by a diaphragm comprising a rubber membrane and a partition in a sealed state, a first liquid chamber is defined by inner peripheral faces of the vibration isolating base body and the cylindrical metal fitting forming portions of a chamber wall, a second liquid chamber, which is partitioned from the first liquid chamber by the partition, is defined by the diaphragm forming a portion of a chamber wall thereof, both of the liquid chambers are communicated with each other by an orifice in the partition, and upper and lower metal fittings, for fixing the vibration isolating mount to a supporting body and a supported body, are connected respectively to a core portion of the rubber vibration isolating base body and an outer peripheral portion of the cylindrical metal fitting, wherein openings are provided at a single or a plurality of portions of the cylindrical metal fitting constituting a side wall of the first liquid chamber, and a rubber elastic membrane covering the side wall of the first liquid chamber is projected in a reversed cup shape at the opening portions and air chambers are formed at an inner side of the reversed cup.

According to the liquid enclosing type vibration isolating mount, the rubber elastic membrane forming the air chambers at the side wall portion of the first liquid chamber is provided to constitute a shape projected into the liquid chamber and accordingly, the surface area thereof on an inner face of the liquid chamber is larger than that in the case where the rubber elastic membrane is formed in a flat plate shape whereby the dynamic spring constant in the high-frequency region is reduced over a wide range by an effect caused by vibration of the rubber elastic membrane. Especially, the dynamic spring constant is reduced over a wide range of 100 through 500 Hz by which muffled sound or transmitting sound in high-speed running is reduced.

According to the above description, the side of the first liquid chamber or the side of the second liquid chamber is referred to as the upper side for convenience of explanation, however, the both chambers may be reversed or horizontally inclined depending on the mode of using thereof.

DETAILED DESCRIPTION OF THE INVENTION

An explanation is given of embodiments of a first embodiment of the invention with reference to FIGS. 1 through 10.

Figure 1:
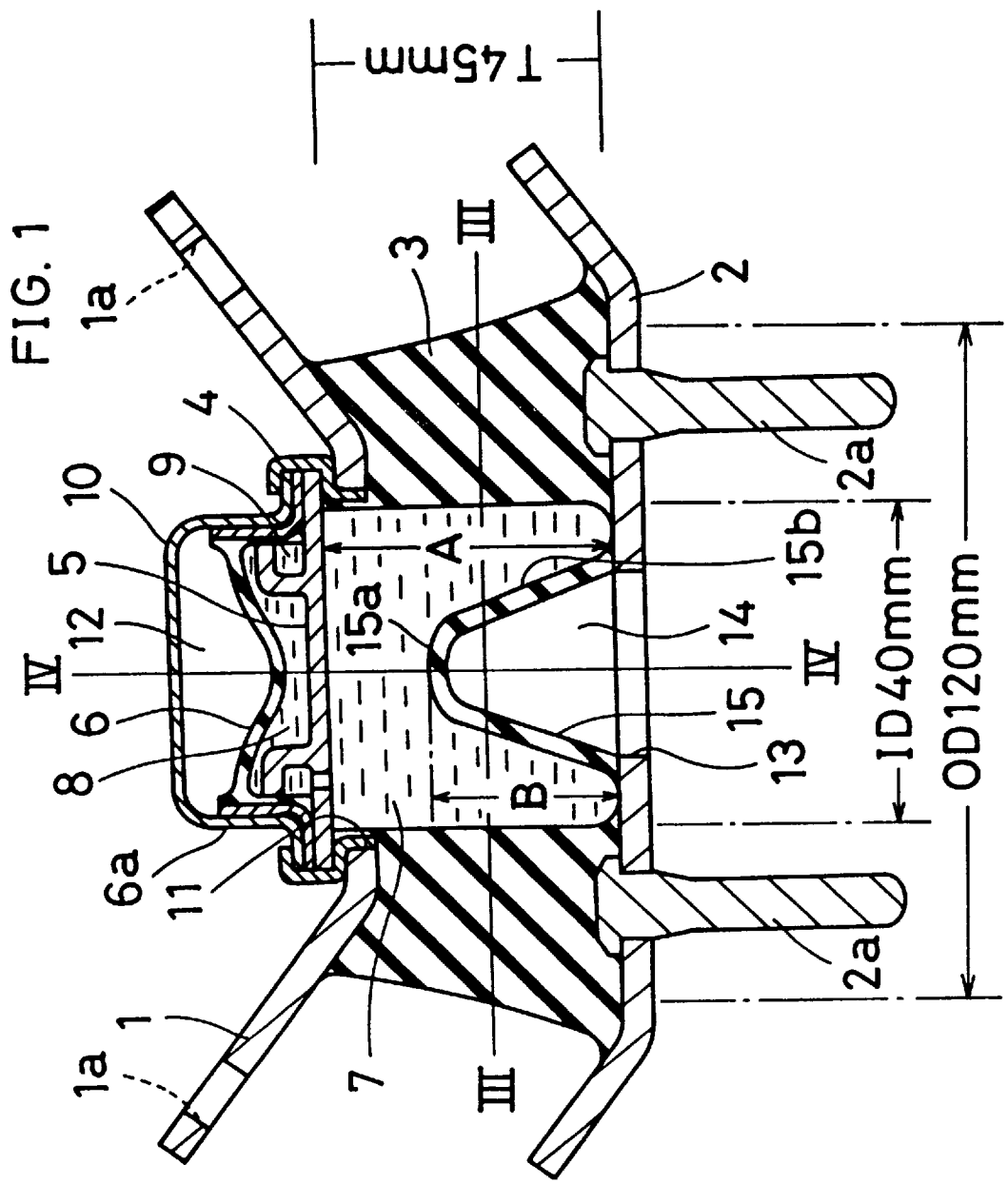
FIG. 1 is a vertical sectional view showing an embodiment of a first invention.

According to an embodiment of a liquid enclosing type vibration isolating mount illustrated in a vertical sectional view of FIG. 1, two upper and lower metal fittings 1 and 2 having a plate-like shape are integrally fixed to upper and lower openings of a vibration isolating base body 3, comprising a rubber elastic body having a ring-like shape, respectively in a sealed state during curing and forming the vibration isolating base body 3 and are integrally assembled to oppose each other via the vibration isolating base body 3.

The upper metal fitting 1 is provided with attaching holes 1a, the lower side metal fitting 2 is projected with attaching bolts 2a and normally, one of the metal fittings, mainly the upper metal fitting 1 is fixed to the side of a vibration generating body such as an automobile engine and the lower metal fitting 2 is fixed to the side of a supporting body such as a chassis of a vehicle body.

One of the metal fittings, for example, the upper metal fitting 1 in FIG. 1, is fixed with a fixing member 4 at a central opening portion 11 thereof by welding means or the like. A partition 5 and a diaphragm 6 are fixed to the fixing member 4 in a sealed state by a caulking means of the fixing member 4 and a liquid is enclosed in a first liquid chamber 7 where the vibration isolating base body 3 constitutes a portion of the chamber wall and a second liquid chamber 8 where the diaphragm 6 constitutes a portion of the chamber wall and the both chambers are partitioned by the partition 5. Further, both liquid chambers 7 and 8 are communicated with each other by an orifice flow path 9 formed at the outer periphery of the partition 5 thereby constituting the liquid enclosing type vibration isolating mount of dual chambers type.

Figure 2:
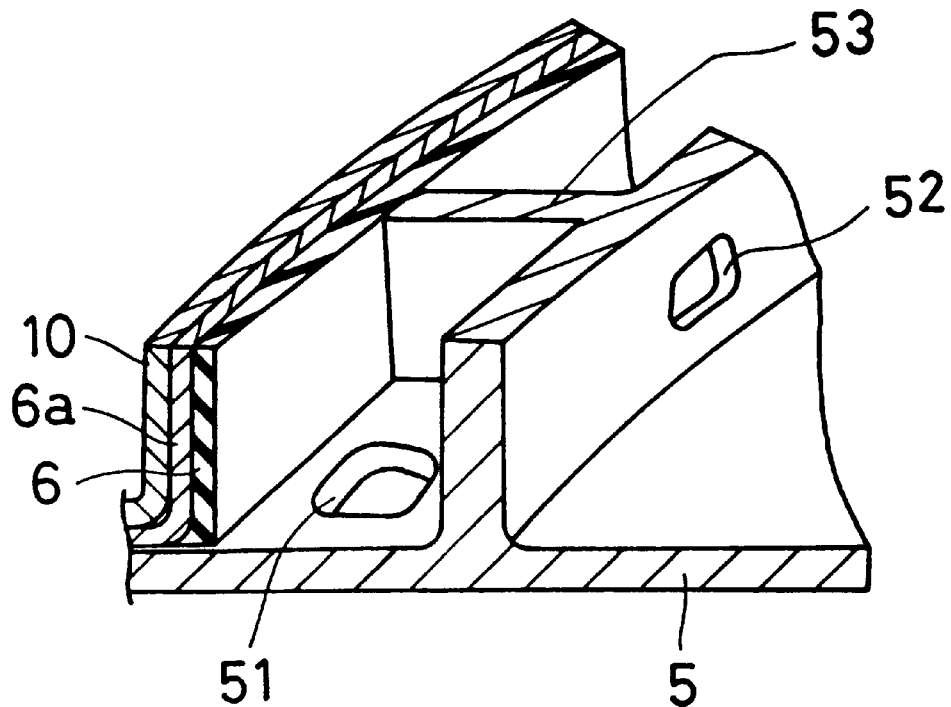
FIG. 2 is a schematic perspective view for explaining an orifice flow path of a vibration isolating mount of FIG. 1.

As shown by FIG. 2, the orifice flow path 9 is provided with an opening 51 for the first liquid chamber, an opening 52 for the second liquid chamber and a partition 53 preventing the openings 51 and 52 from shortcutting. The liquid that is made to flow into the orifice flow path 9 from the first liquid chamber 7 via the opening 51, open to the first liquid chamber, and is made to flow out through the opening 52 open to the second liquid chamber after flowing around the outer periphery of the partition 5.

In the illustrated example, the periphery of a cover 10 covering the outside of the diaphragm 6, is integrally fixed with the diaphragm 6, an auxiliary metal fitting 6a supporting the diaphragm 6 and the partition 5 by the caulking means of the fixing member 4 and an air chamber 12 is formed outside of the diaphragm 6. The air chamber 12 may communicate with outside air or may be sealed with no communication to outside air.

Also, a rubber elastic membrane 15 in a projected shape is integrally fixed by a curing and forming means to the metal fitting 2 constituting a portion of the chamber wall of the first liquid chamber 7 on the side of the vibration isolating base body 3 so as to form an air chamber 14 communicating with outside air via a central opening portion 13 having a smaller diameter than that of the opening of the vibration isolating base body 3. The air chamber 14 may be a sealed chamber.

Figure 3:
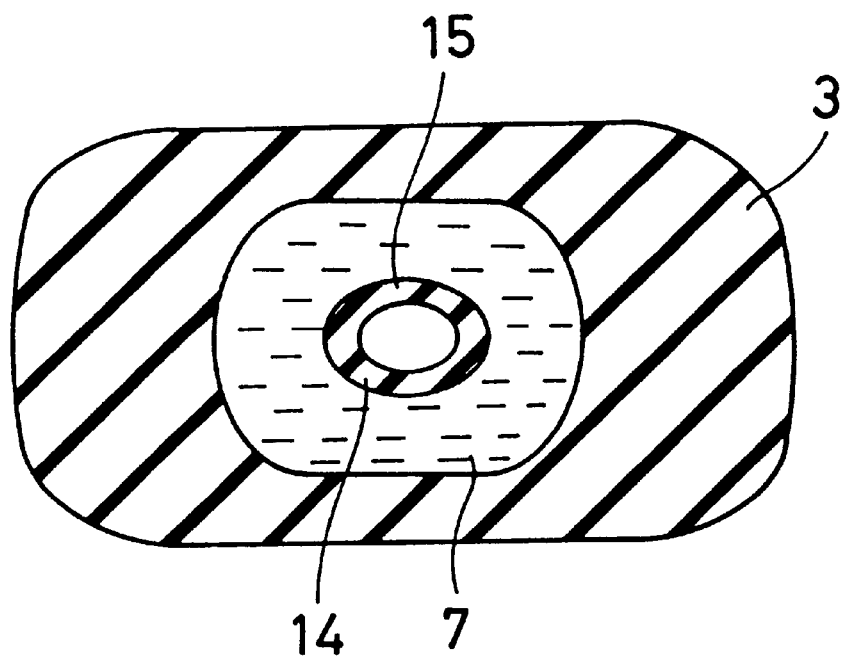
FIG. 3 is a horizontal sectional view taken aloes a line III—III of FIG. 1 cutting the vibration isolating mount.

FIG. 3 illustrates a cross-sectional face of the vibration isolating mount of FIG. 1 cut along a line III—III. The cross-sectional faces of the vibration isolating base body 3 and the rubber elastic membrane 15 are formed in a substantially elliptical shape or a square shape with rounded corners.

Figure 4:
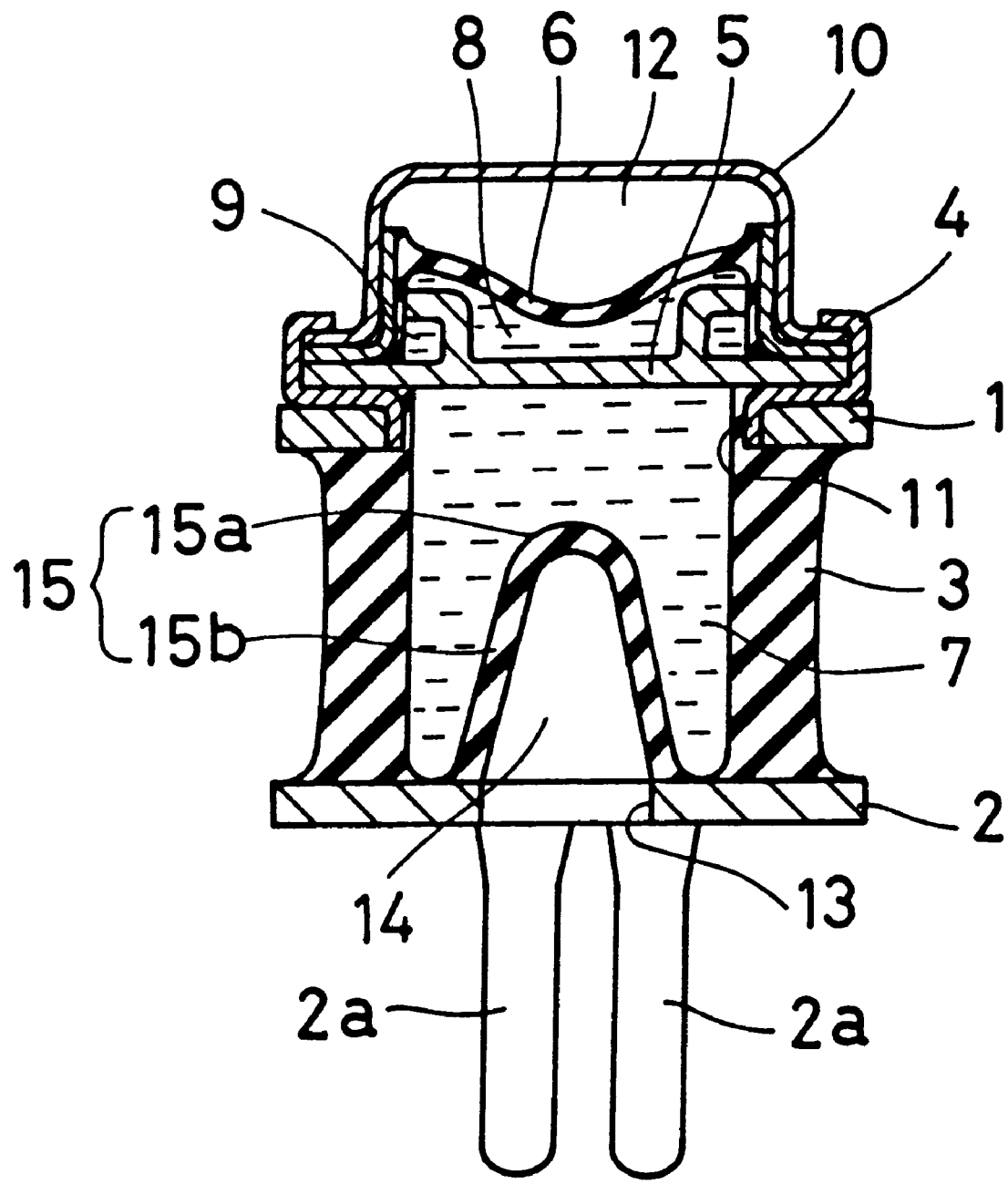
FIG. 4 is a vertical sectional view taken along a line IV—IV of FIG. 1 cutting the vibration isolating mount.

FIG. 4 illustrates a vertical sectional face of the vibration isolating mount 1 cut along a line IV—IV of FIG. 1.

Figure 5:
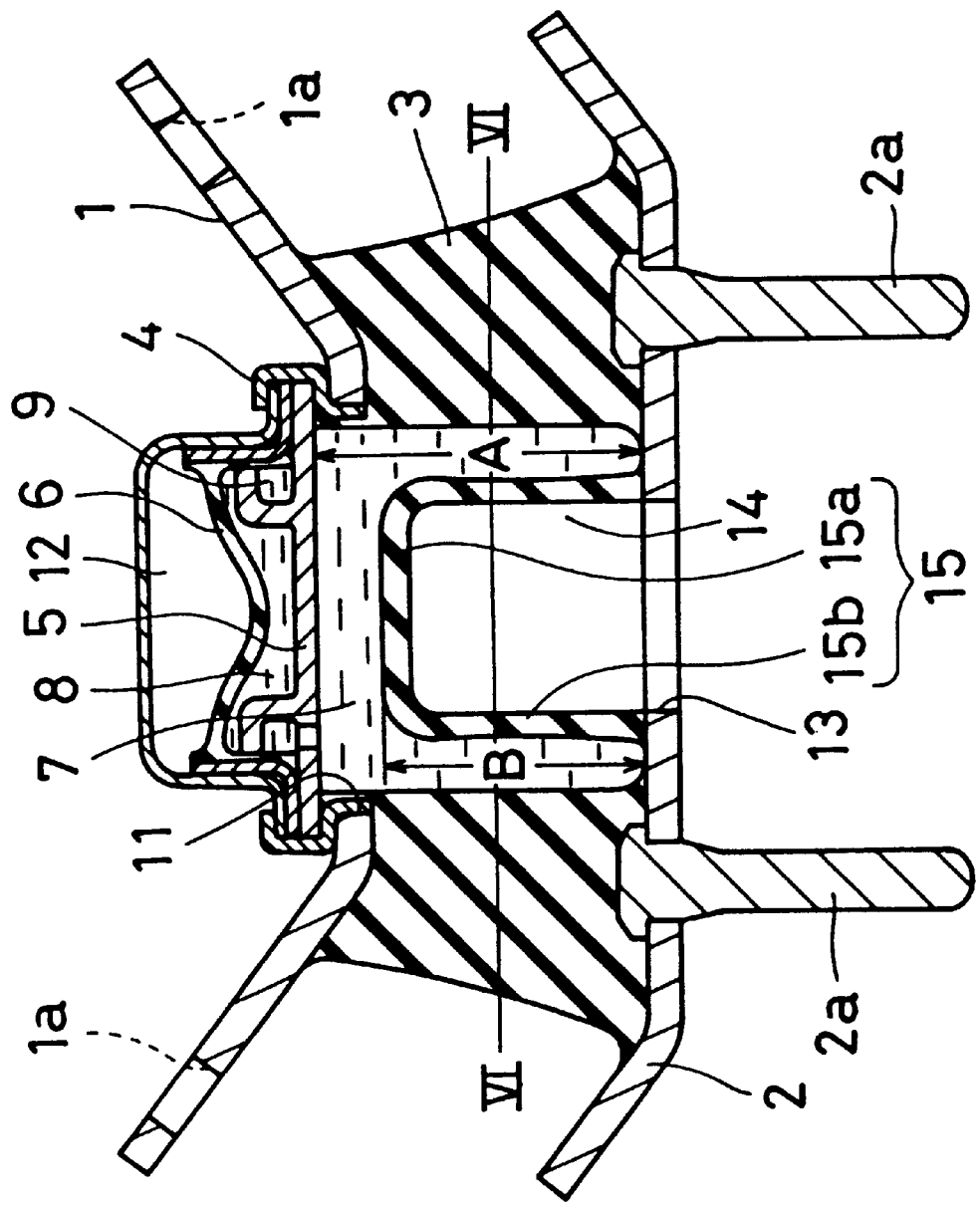
FIG. 5 is a vertical sectional view of another embodiment of the first invention.

The rubber elastic membrane 15 may have a shape of an elliptical cone in the embodiment of FIG. 1 as well as a quadrangular prism where the front end portion is flattened as in an embodiment of FIG. 5 or other various shapes.

Figure 6:
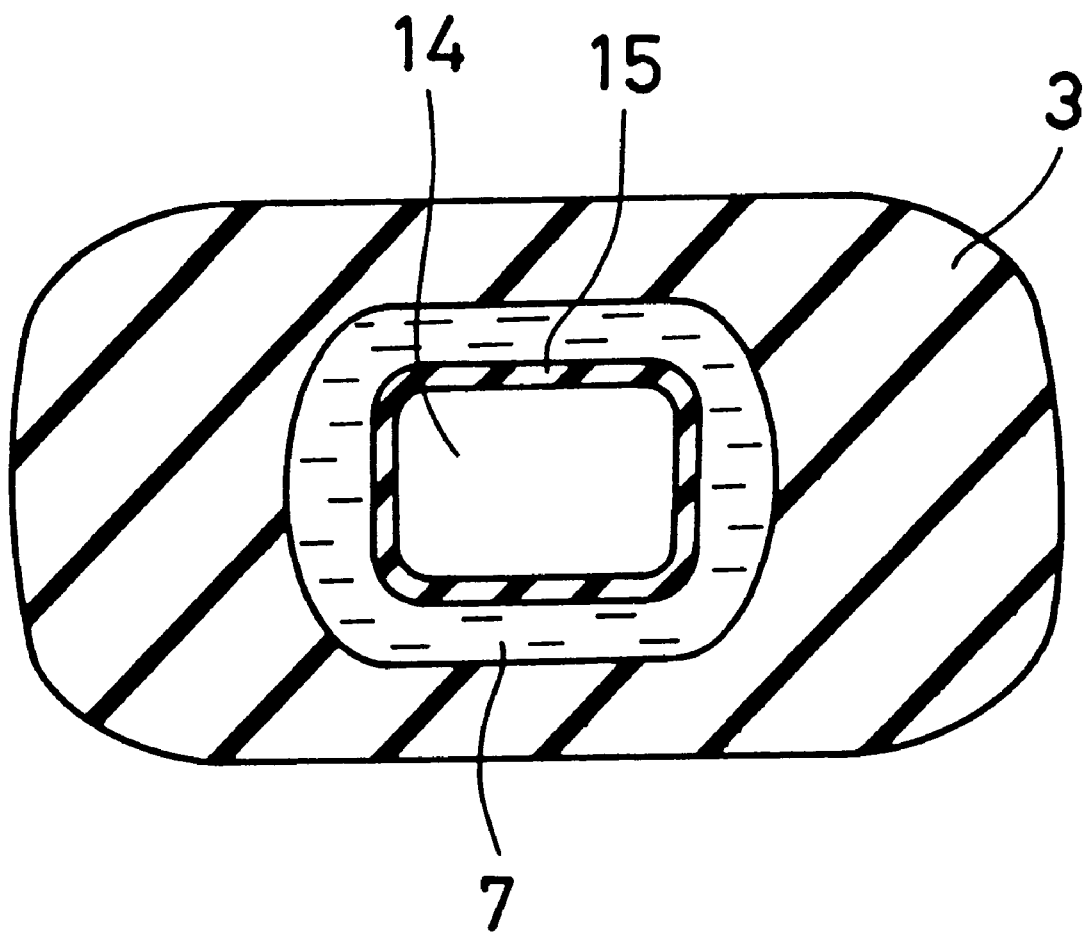
FIG. 6 is a horizontal sectional view taken along a line VI—VI of FIG. 5 cutting a vibration isolating mount.
Figure 7:
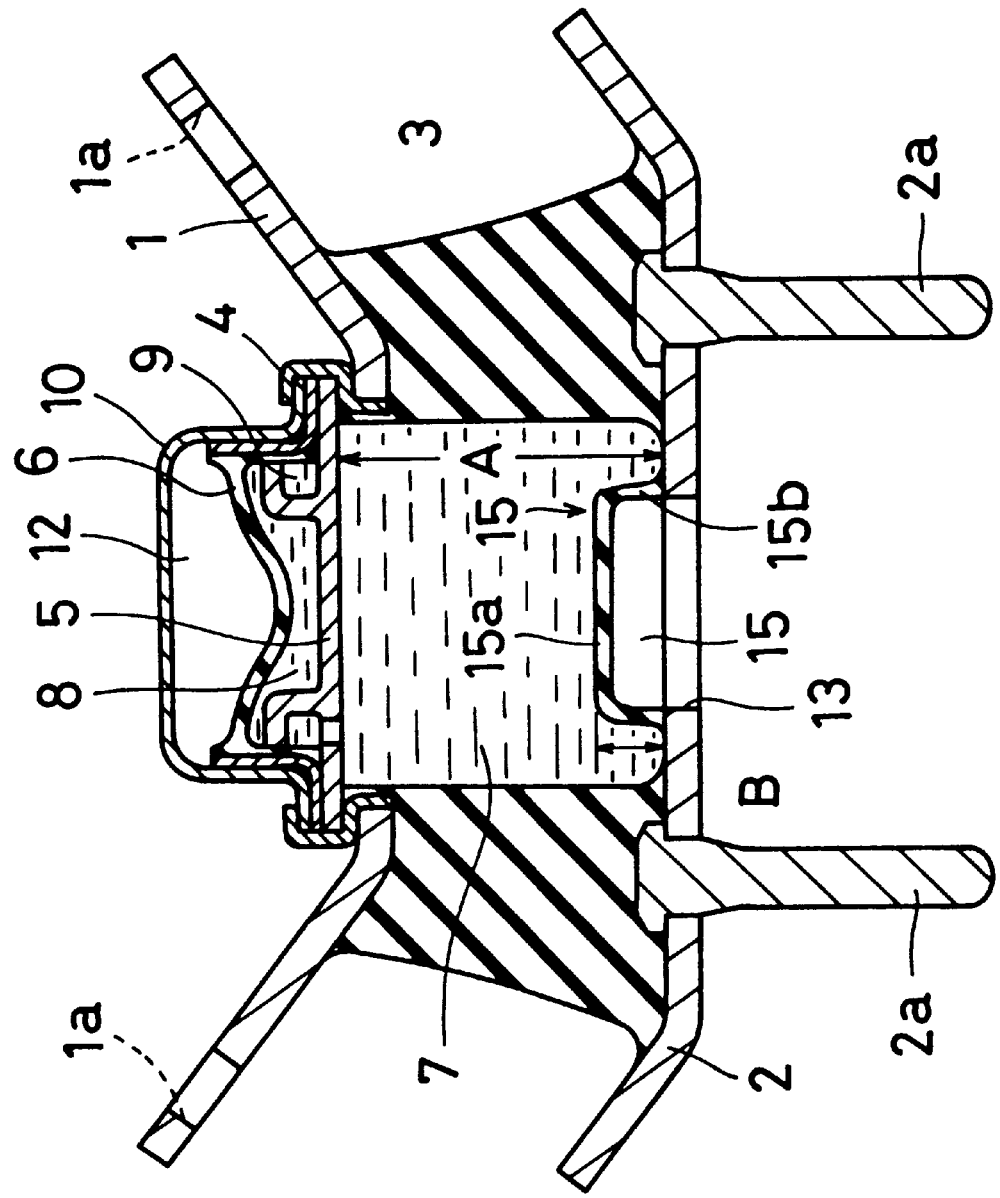
FIG. 7 is a vertical sectional view of another modified example of the vibration isolating mount of FIG. 5.

In any case it is preferable in view of the vibration attenuating effect that a front end portion 15a of the rubber elastic membrane 15 is rather hard and a peripheral side face portion 15b is a little softer than the front end portion 15a thereby providing a good response in respect of vibration. For that purpose it is preferable that the vertical section of the rubber elastic membrane 15 is formed in a substantially triangular shape thereby providing a pertinent rigidity to the front end portion 15a and the front end portion 15a having a flat face is formed a little thicker than the peripheral side face portion 15b as illustrated by FIG. 5 or FIG. 7. FIG. 6 is a cross-sectional view of a vibration isolating mount of FIG. 5 cut along a line VI—VI.

Figure 8:
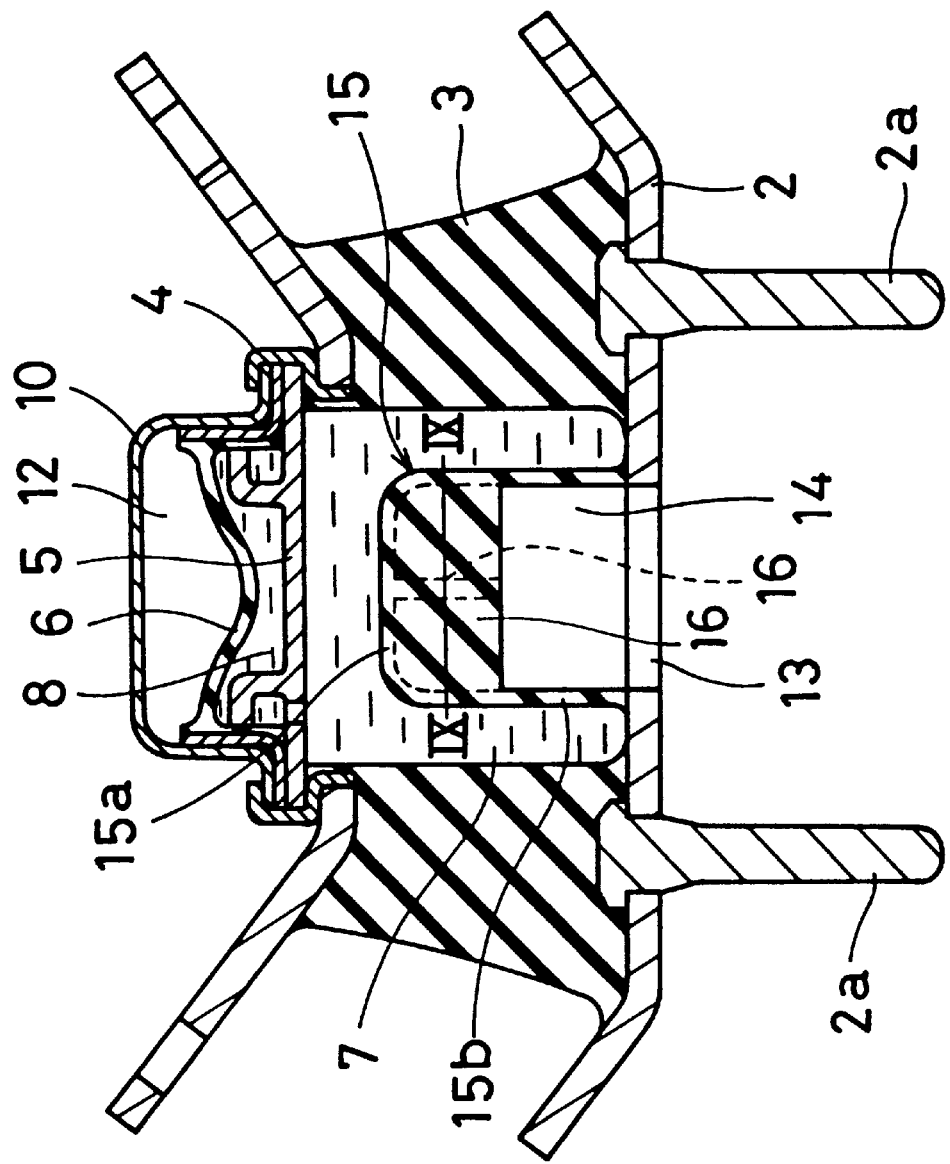
FIG. 8 is a vertical sectional view of another modified example of the vibration isolating mount of FIG. 5 where ribs each in a flat plate shape are integrally provided to the inner side of a front end portion of a rubber elastic membrane.
Figure 9:
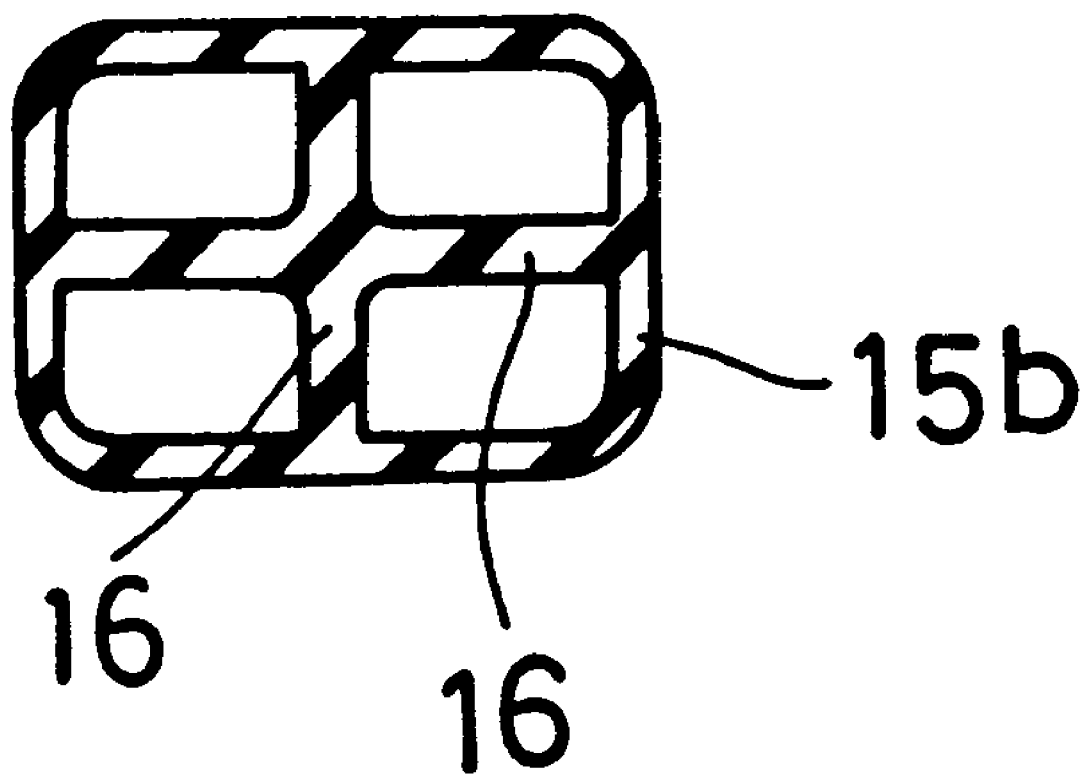
FIG. 9 is a horizontal sectional view taken along a line IX—IX of FIG. 8 cutting the vibration isolating mount.

As shown in a modified example illustrated by FIG. 8 and FIG. 9, ribs 16 in the lengthwise and breathwise directions may be integrally provided to the inside of the front end portion 15a of the rubber elastic membrane 15 having the projected shape thereby promoting the rigidity of the front end portion 15a of the rubber elastic membrane 15.

Incidentally, although the height B of the rubber elastic membrane 15 is normally set to 20% or more of a dimension in the height direction of the first chamber 7, that is, the interval A between the metal fixing 2 and the partition 5 in view of the vibration attenuating effect, the maximum height is set such that the rubber elastic membrane 15 is not brought into contact with the partition 5 even with a large amplitude of vibration.

The vibration isolating mount is used by being fixed respectively to the side of a vibration generating body such as an engine or the like and the supporting side such as a chassis or the like by the upper and lower metal fittings 1 and 2 as a mount supporting an engine of an automobile.

When it is used, the high frequency vibration during running is basically absorbed by the vibration isolating base body 3 comprising a rubber elastic body and the low frequency vibration during idling or the like, is effectively absorbed by making the liquid in the first and second chambers 7 and 8 flow reversibly via the orifice flow path 9. That is, the excellent vibration attenuating performance and the vibration isolating performance are achieved by the liquid flow effect between the liquid chambers 7 and 8 and the vibration isolating effect of the vibration isolating base body 3.

Figure 18:
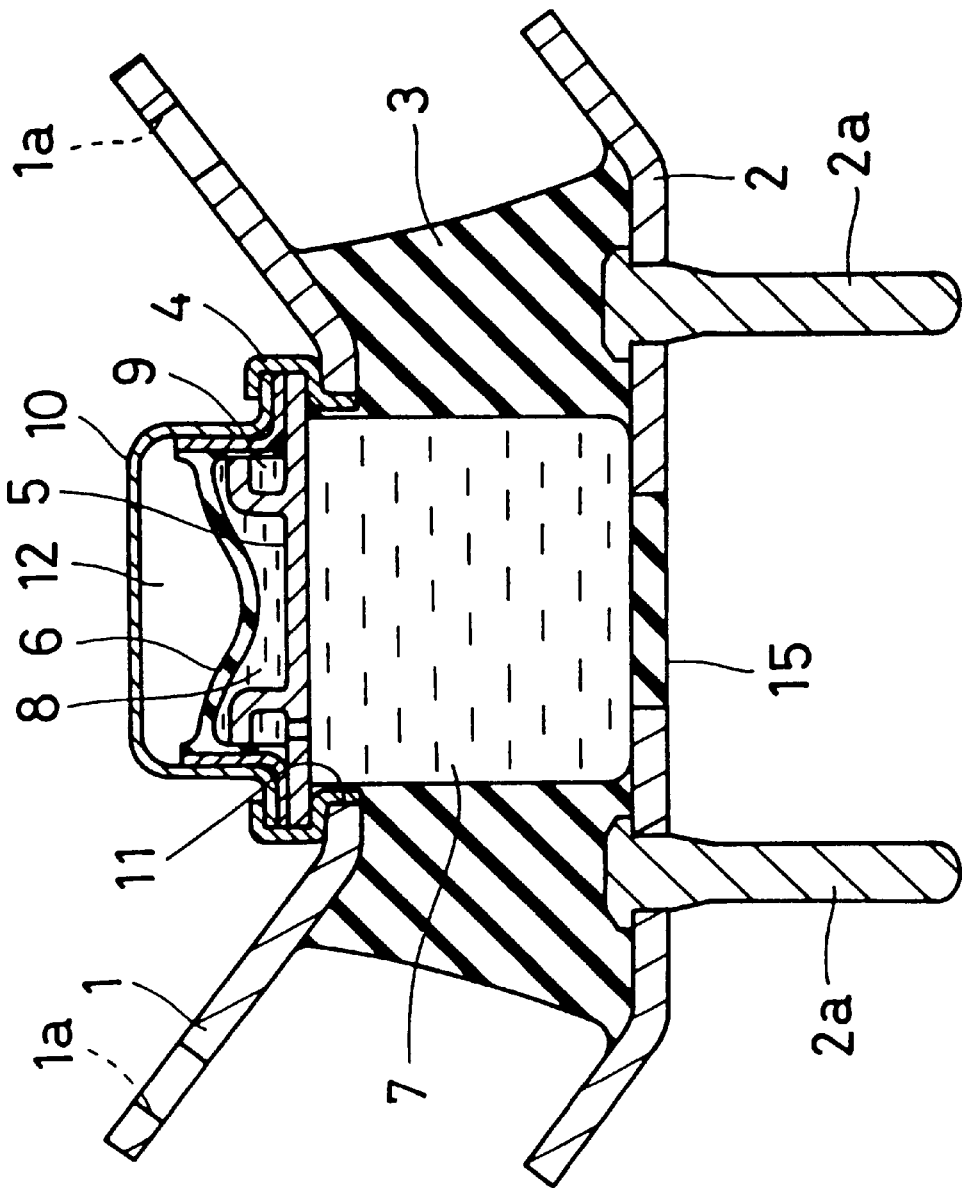
FIG. 18 is a horizontal sectional view of a conventional vibration isolating mount relative to the first invention.

Especially, the rubber elastic membrane 15 forming the air chamber 14 is installed to the metal fitting 1 on the side of the first chamber 7 and on the side of the vibration isolating base body 3, to constitute a projected shape in the liquid chamber 7 and accordingly, the surface area thereof on the side of the liquid chamber 7 is larger than that in the case where the rubber elastic membrane is formed in a flat plate shape flush with the wall face, as illustrated in FIG. 18. Thus, the dynamic spring constant in the high frequency region is reduced over a wide range owing to the effect derived from the vibration of the rubber elastic membrane 15. That is, the dynamic spring constant is reduced over a wide range even in the high frequency region where the amplitude is extremely small and the speed of vibration is fast, especially in an extremely high frequency region of 400 Hz or more by which muffled sound in high-speed running is reduced.

Figure 10:
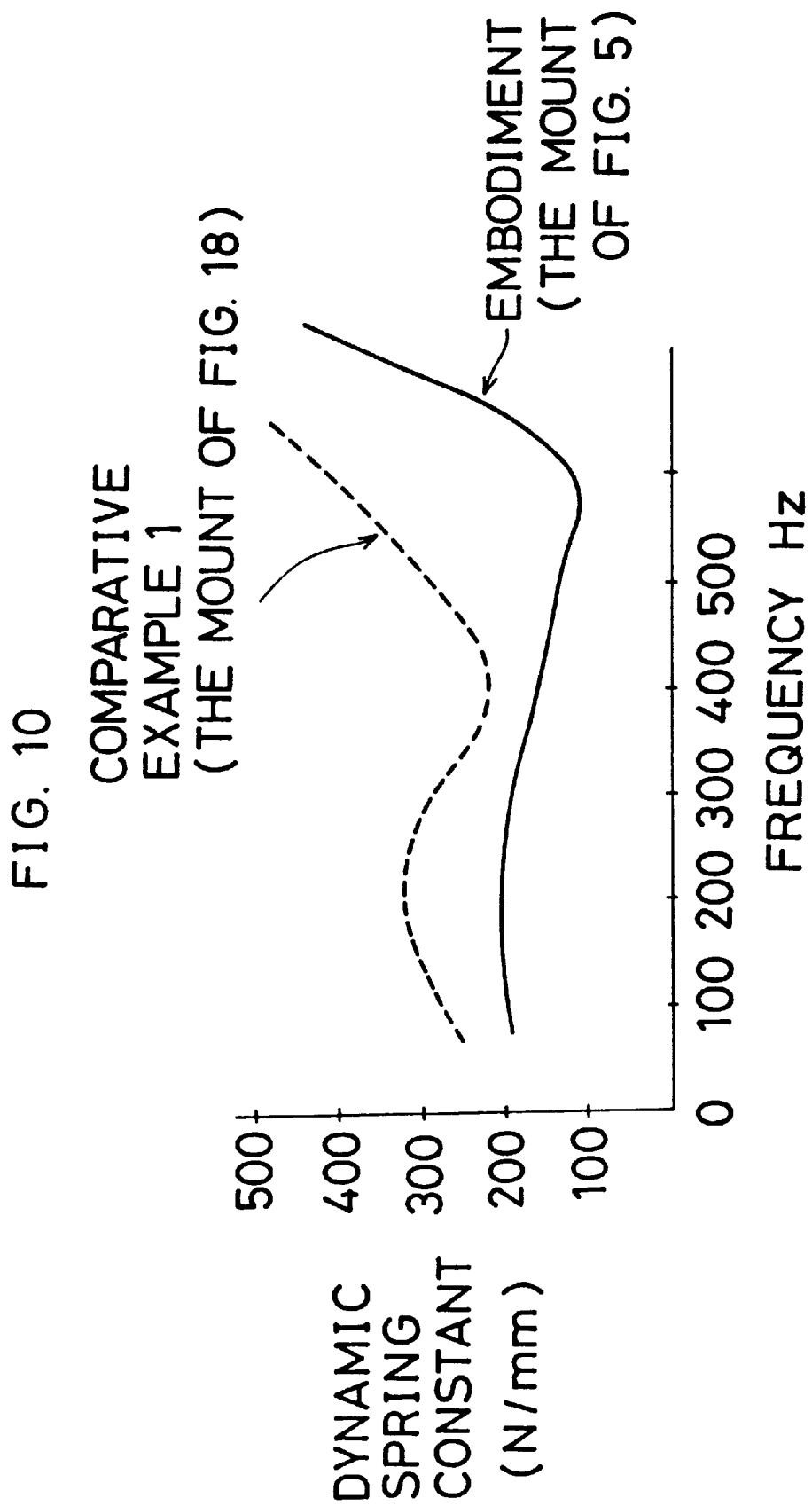
FIG. 10 illustrates graphs showing a relation between the frequency and the dynamic spring constant in respect of the liquid enclosing type vibration isolating mount according to the first invention.

FIG. 10 indicates a comparison of the relation between the frequency and the dynamic spring constant with respect to the embodiment of the rubber elastic membrane 15 having a projected shape of FIG. 5 and that of the conventional rubber elastic membrane of Comparative Example 1 having the simple flat plate shape of FIG. 18 in view of the vibration isolating characteristic.

Blending of rubber is as described below and an aqueous solution of 50% glycerin was used as the liquid of the liquid chambers. The height T, the outer diameter (at a half of the height of the base body) OD and the inner diameter ID of the operation isolating base body 3 are respectively, 15, 120 and 40 mm.

The rubber comprises 100 weight parts of natural rubber, 40 weight parts of HAF class carbon black, 6 weight parts of aromatic oil, 5 weight parts of zinc white and 2.2 weight parts of sulphur.

The measurement of the dynamic spring constant of rubber is carried out by a compression test at 25° C. and 100 Hz by using a visco-elasticity measuring device ("Rheolographsolid" made by Toyo Seiki Seisaku-sho Co., Ltd) after sufficiently heating and curing the rubber.

As is apparent from FIG. 10, in the case of the conventional mount of FIG. 18, the dynamic spring constant is increased in a frequency region around 200 Hz and when the frequency exceeds 400 Hz, the effect of reducing the dynamic spring constant is not observed, whereas in the case of the mount of FIG. 5, the dynamic spring constant at around 100 through 200 Hz is reduced compared with that of the conventional mount and, in a wide range of the high frequency region of 400 through 600 Hz, the dynamic spring constant is significantly reduced thereby effecting in reducing muffled sound in the high-speed running.

An explanation will be given of embodiments of a second invention in reference to FIGS. 11 through 17.

Figure 11:
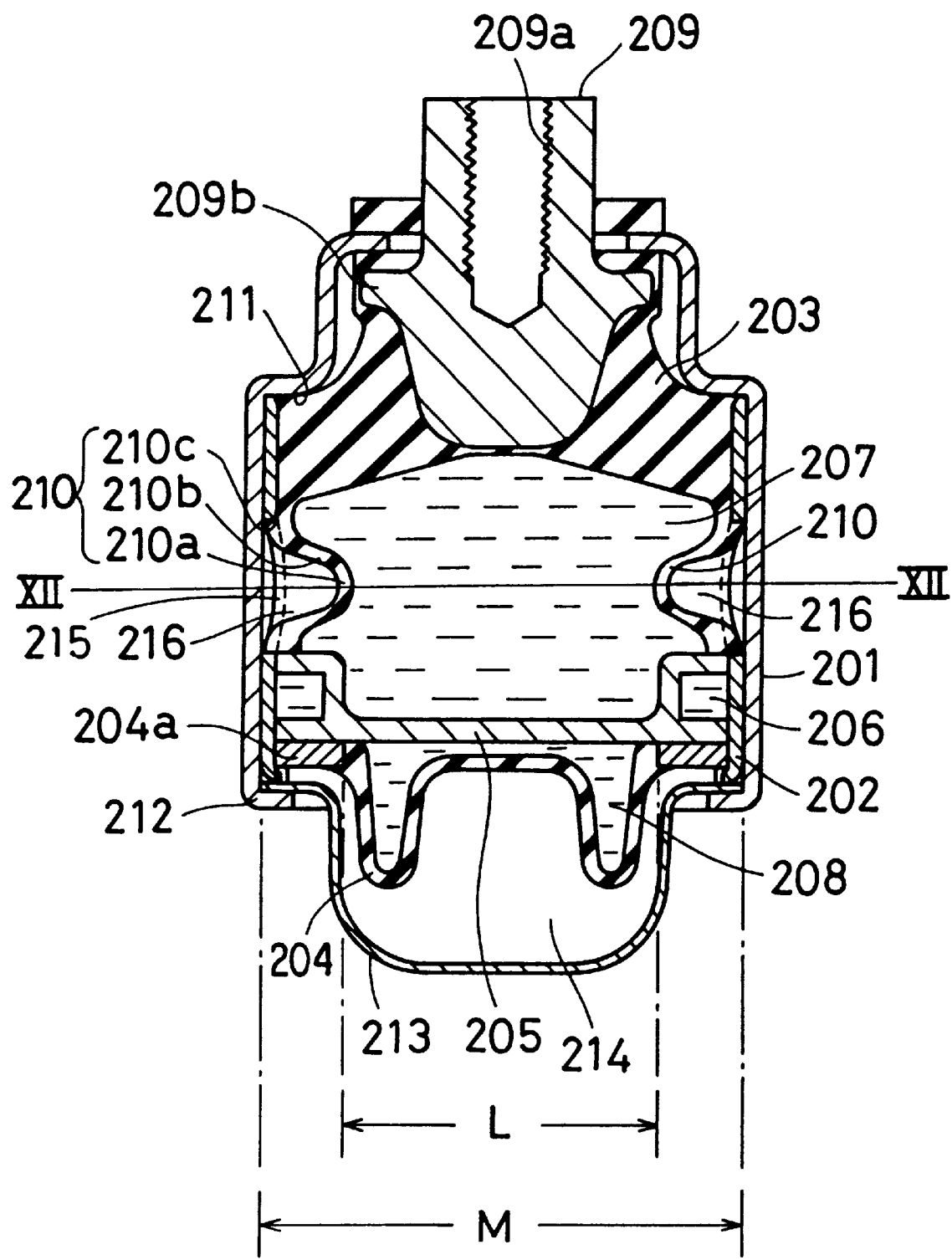
FIG. 11 is a vertical sectional view showing an embodiment of a liquid enclosing type vibration isolating mount according to a second invention.

According to an embodiment of a liquid enclosing type vibration isolating mount as illustrated by a vertical sectional view of FIG. 11, a vibration isolating base body 203 comprising a rubber elastic body for receiving a load of an engine is attached to the upper opening portion of a cylindrical metal fitting 202 for fixing that is fixed to a main body metal fitting 201 in cylindrical shape in a sealed state by a curing and forming means, a diaphragm 204 comprising a rubber membrane and a partition 205 are attached to the lower opening portion of the cylindrical metal fitting 202 in a sealed state, an inner chamber, formed between the vibration isolating base body 203 and the diaphragm 204, is partitioned into a first liquid chamber 207, where the vibration isolating base body 203 and the cylindrical fitting 202 constitute portions of the chamber wall, and a second liquid chamber 208, where the diaphragm 204 constitutes a portion of the chamber wall, by the partition 205 having a groove for an orifice 206 at its outer periphery, and the liquid chambers 207 and 208 are communicated with each other by the orifice 206. Thereby, the liquid enclosing type vibration isolating mount with dual chambers is constituted.

A metal fitting 209 is embedded in the vibration isolating base body 203 by a curing and forming means and a screw hole for connection 209a for an attaching bolt is provided in the metal fitting 209. Normally, either one of the main body metal fitting 201 for fitting the cylindrical metal fitting 202 and the metal fitting 209 may be on the engine side. For example, the metal fitting 209 is fixed to a bracket on the side of a vibration generating body such as an automobile engine or the like and the main body metal fitting 201 is fixed to the supporting side such as a chassis of a vehicle body or the like. The main body fitting 201 is provided with stays for attaching when necessary.

In respect of the partition 205 and the diaphragm 204, as illustrated by FIG. 11, the partition 205 having the groove for the orifice at its outer periphery and an auxiliary metal fitting 204a installed to the peripheral portion of the diaphragm 204, are fitted to the inner periphery of the opening portion of the cylindrical metal fitting 202 and are fixed there by a caulking means at an end edge of the cylindrical metal fitting 202 such that they do not come off.

The cylindrical fitting 202 is fitted into the main body metal fitting 201 up to the position of a stepped portion 211 on the upper side from the lower opening portion and is attached, such that it does not come off, by bending a lower end portion 212 of the main body metal fitting 201 toward the inner side. Further, a cover 213 covering the outside of the diaphragm 204 integrally with the cylindrical metal fitting 202, is also integrally attached there and forms an air chamber 214 outside of the diaphragm 204. The air chamber 214 may communicate with outside air or may constitute a sealed air chamber that does not communicate with outside air.

The upper end portion of the main body fitting 201 is extended upwardly and is bent toward the inner side at slightly above a flange portion 209b of the metal fitting 209 to thereby achieve a stopper action for vibrations of a large amplitude.

Figure 15:
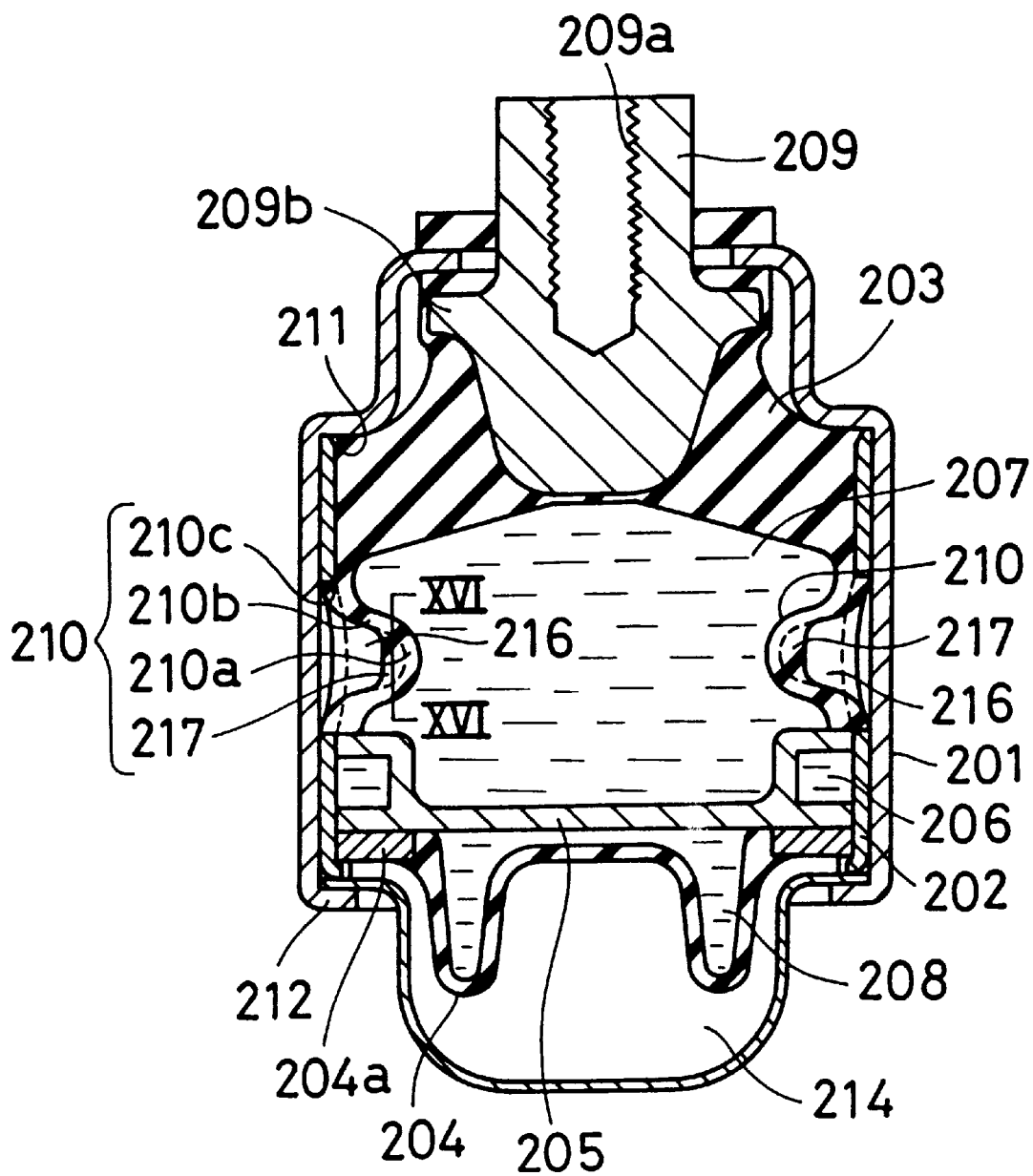
FIG. 15 illustrates a modified example of the vibration isolating mount of FIG. 11 where ribs in lengthwise and breathwise directions are integrally provided to the inside of the front end portion of the rubber elastic membrane.

Openings 215 are installed at a single or a plurality of portions, for example, two opposed portions as shown by FIG. 15, of the cylindrical metal fitting 202 constituting the peripheral outside wall of the first liquid chamber 207 and a rubber elastic membrane 210, in a shape projecting and bulging toward the inside of the first liquid chamber 207, is installed to form air chambers 216 at the opening portions 215. The air chambers 216 may communicate with the outside air or may constitute sealed chambers which do not communicate with outside air.

Figure 12:
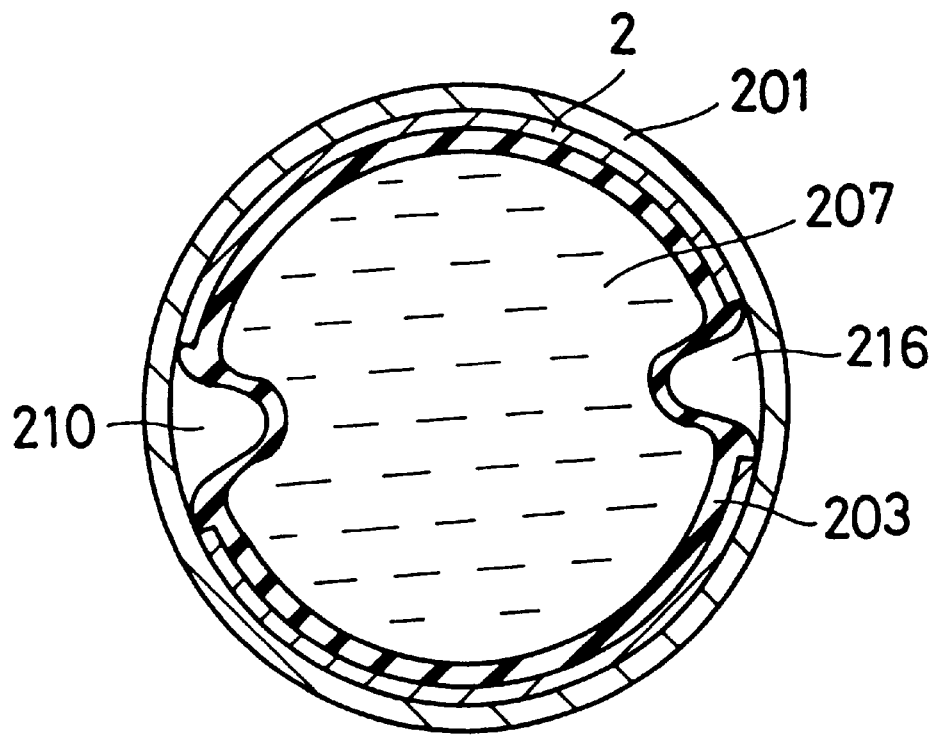
FIG. 12 is a horizontal sectional view taken along a line XII—XII of the vibration isolating mount of FIG. 11.
Figure 13:
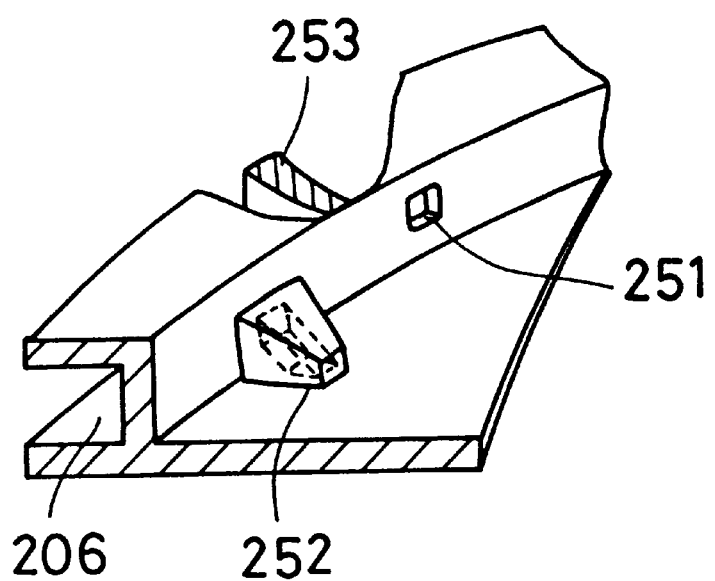
FIG. 13 is a perspective view schematically showing the structure of an orifice flow path communicating a first and a second liquid chamber.

FIG. 12 is a horizontal sectional view taken along a line XII—XII of the vibration isolating mount of FIG. 1. Also, FIG. 13 is a schematic view of the structure of the orifice 206 communicating the first and the second liquid chambers. As shown by FIG. 13, the orifice flow path 206 is provided with an opening 251 for the first liquid chamber, an opening 252 for the second liquid chamber and a partition 253 for preventing the openings 251 and 252 from shortcutting. The liquid which is made to flow through the orifice flow path 206 from the first liquid chamber 207 via the opening 251 for the first liquid chamber, is made to flow out via the opening 252 chamber after flowing around for the second liquid chamber after flowing around substantially the outer periphery of the partition 205.

The rubber elastic membrane 210 is normally fixed to the cylindrical metal fitting 202 integrally with the vibration isolating base body 203 by a curing and forming means as illustrated in FIG. 11, however, it may be installed separately from the vibration isolating base body 203.

Figure 14:
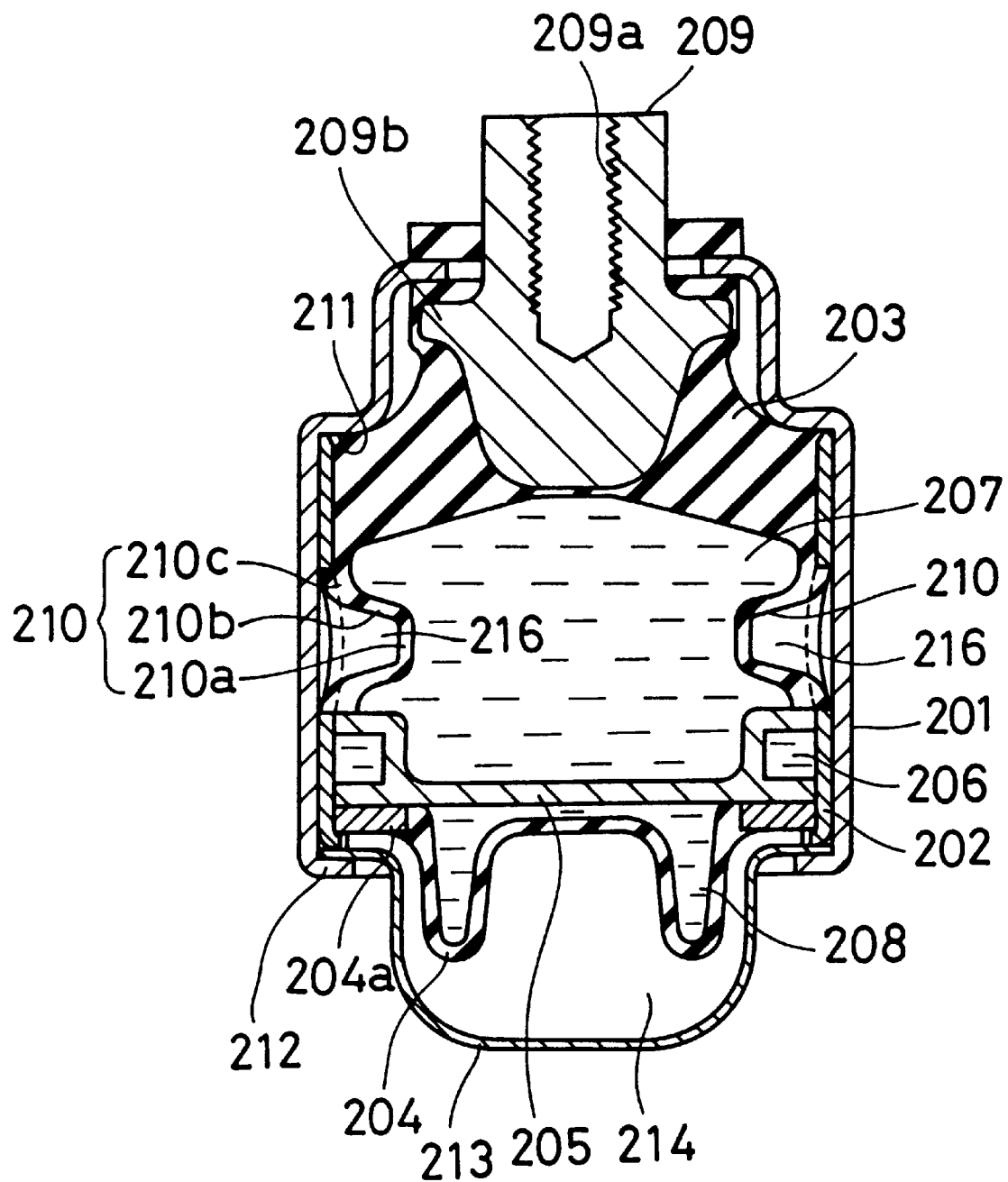
FIG. 14 is a vertical sectional view showing a modified example of the vibration isolating mount of FIG. 11 where a front end portion of a rubber elastic membrane is made to be a flat face and is bulged in a substantially square form with respect to the section.

The rubber elastic membrane 210 may be bulged in a semicircular shape or a substantially triangular shape in respect of the section as in the embodiment of FIG. 11 or bulged in a substantially square shape in respect of the section where the front end portion is flattened as in FIG. 14, or in various shapes.

In any shape of the rubber elastic membrane 210, it is preferable that side face portions 210b in the projected shape are rather softer than a front end portion 210a and are provided with good response and a base portion 210c is provided with a pertinent strength. Accordingly, it is preferable that the front end portion 210a is formed rather thicker than the side end portions 210b and the base portion 210c is thicker than the other portions.

Figure 16:
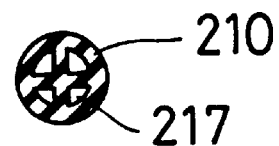
FIG. 16 is a cross-sectional view taken along a line XVI–XVI of FIG. 15 cutting the vibration isolating mount.

Also, as in an embodiment of FIG. 15, ribs 217 in the lengthwise and breathwise directions may integrally be provided on the inner side of the front end portion 210a of the rubber elastic membrane 210 in a projected shape by which the rigidity of the front end portion 210a of the rubber elastic membrane 210 is promoted. FIG. 16 is a horizontal sectional view of the vibration isolating mount cut along a line XVI—XVI of FIG. 15.

The height of the projection of the rubber elastic membrane 210 may be set such that it is not brought into contact with other portions and does not interfere therewith even in the case of a large amplitude of vibration.

Incidentally, although the cylindrical metal fitting 202 may serve also as a main body metal fitting by omitting the main body metal fitting 201, it is preferable that the cylindrical metal fitting 202 is fitted to the inner periphery of the main body metal fitting 201 in view of protecting the rubber elastic membrane 210 at the openings 215 as illustrated in the drawings.

The vibration isolating mount is used by being fixed to the side of a vibration generating body, such as an engine or the like, and the supporting side, such as a chassis or the like, by the upper metal fitting 209 and the main body metal fitting 201 as the mount supporting an engine of automobile.

In using it, the high frequency vibration during running is basically absorbed by the vibration isolating base body 203 comprising a rubber elastic body, and the low frequency vibration during idling or the like is effectively absorbed by making the liquid in the first and the second liquid chambers 207 and 208 reversibly flow via the orifice 206. That is, the excellent vibration attenuating performance and the vibration isolating performance are achieved by the liquid flow effect between the liquid chambers 207 and 208 and the vibration isolating effect of the vibration isolating base body 203.

Especially, the openings are provided at a single or a plurality of portions of the cylindrical metal fitting 202 for fixing constituting the side wall on the side of the first liquid chamber 207, and the rubber elastic membrane 210 forming the air chambers 216 at the opening portions is installed to constitute the shape projecting toward the inside of the liquid chamber 207 and accordingly, the surface area thereof on the side of the liquid chamber 107 is larger than that in the case where the rubber elastic membrane is formed in the flat plate shape flush with the wall face. The dynamic spring constant in the high frequency region is reduced over a wide range by the effect of vibration of the rubber elastic membrane 210, the dynamic spring constant is reduced over a wide range of 100 through 500 Hz and muffled sound and transmitting sound during high-speed running is reduced.

Figure 17:
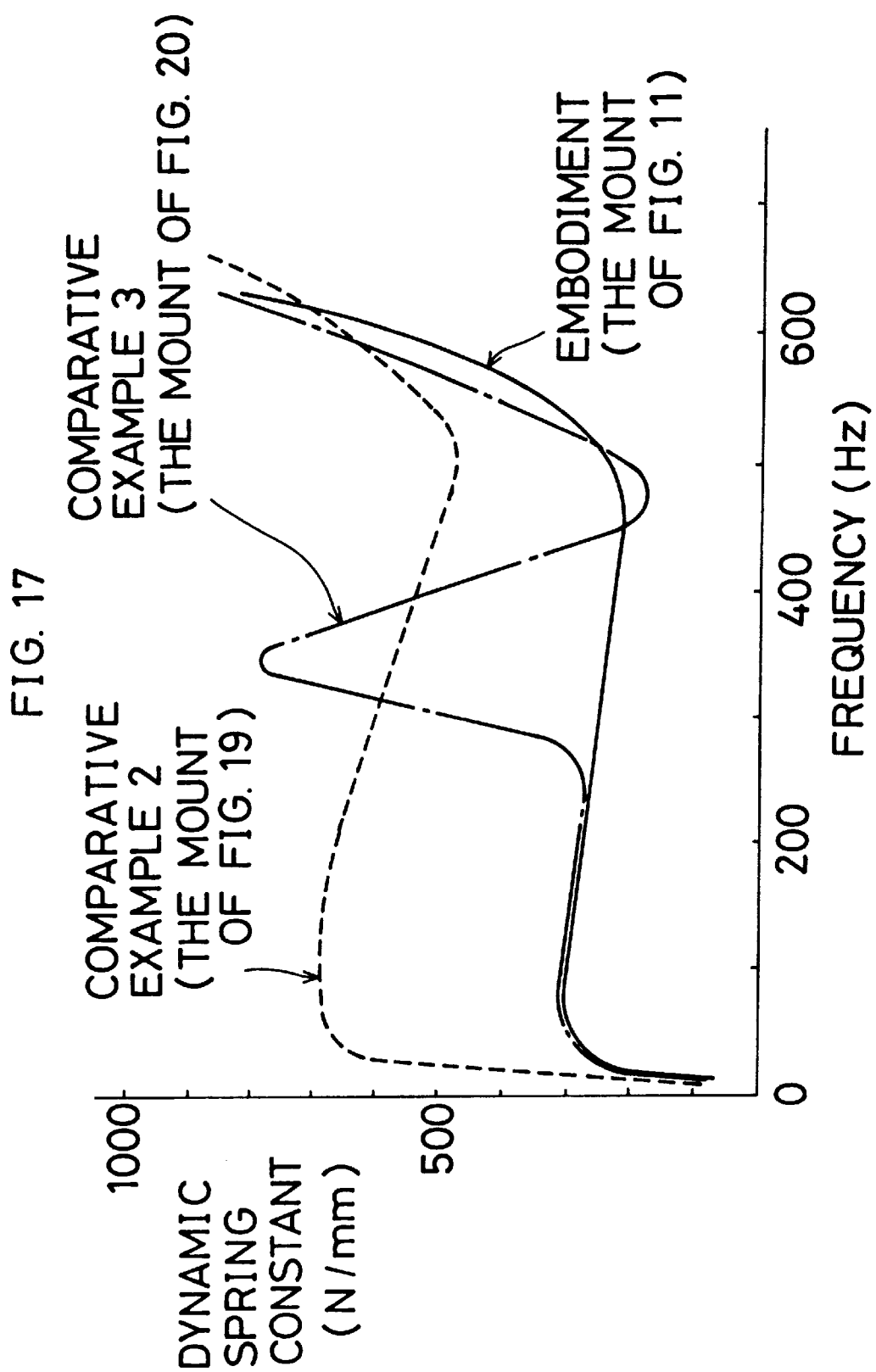
FIG. 17 illustrates graphs showing a relation between the frequency and the dynamic spring constant of the liquid enclosing type vibration isolating mount according to the second invention.

In respect of the vibration isolating property of the vibration isolating mount, a relation between the frequency and the dynamic spring constant with respect to the embodiment of the present invention of FIG. 11, where the rubber elastic membrane 210 in a projected shape is provided, is shown by FIG. 17.

The blend composition of rubber is as described below and an aqueous solution of 50% glycerin is used as the liquid for the liquid chambers. The distance L between that two opposed portions of the rubber elastic membrane 210 is larger than 0.2 times of the outer diameter M of the cylindrical metal fitting 202 (L>M×0.2).

The rubber comprises 100 weight parts of natural rubber, 45 weight parts of HAF class carbon black, 5 weight parts of an aromatic oil, 5 weight parts of zinc white and 2 weight parts of sulphur. The blend composition of the rubber is different from that in the embodiments of FIGS. 1–8 and therefore, the vibration isolating characteristic of the vibration isolating mounts cannot simply be compared with each other.

The measurement of the dynamic spring constant of the rubber is carried out by the method described above.

Figure 19:
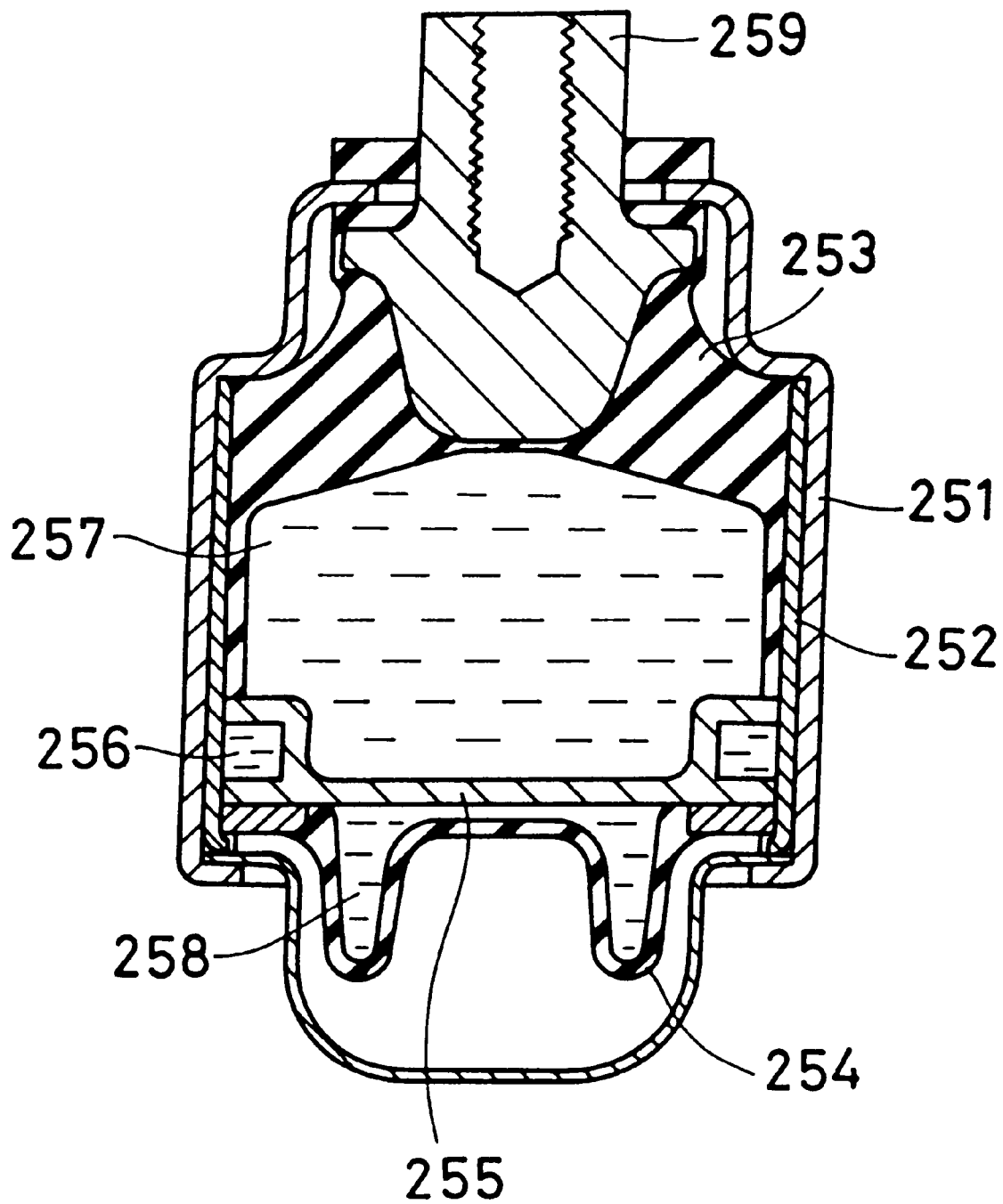
FIG. 19 is a vertical sectional view of a conventional vibration isolating mount relative to the second invention.
Figure 20:
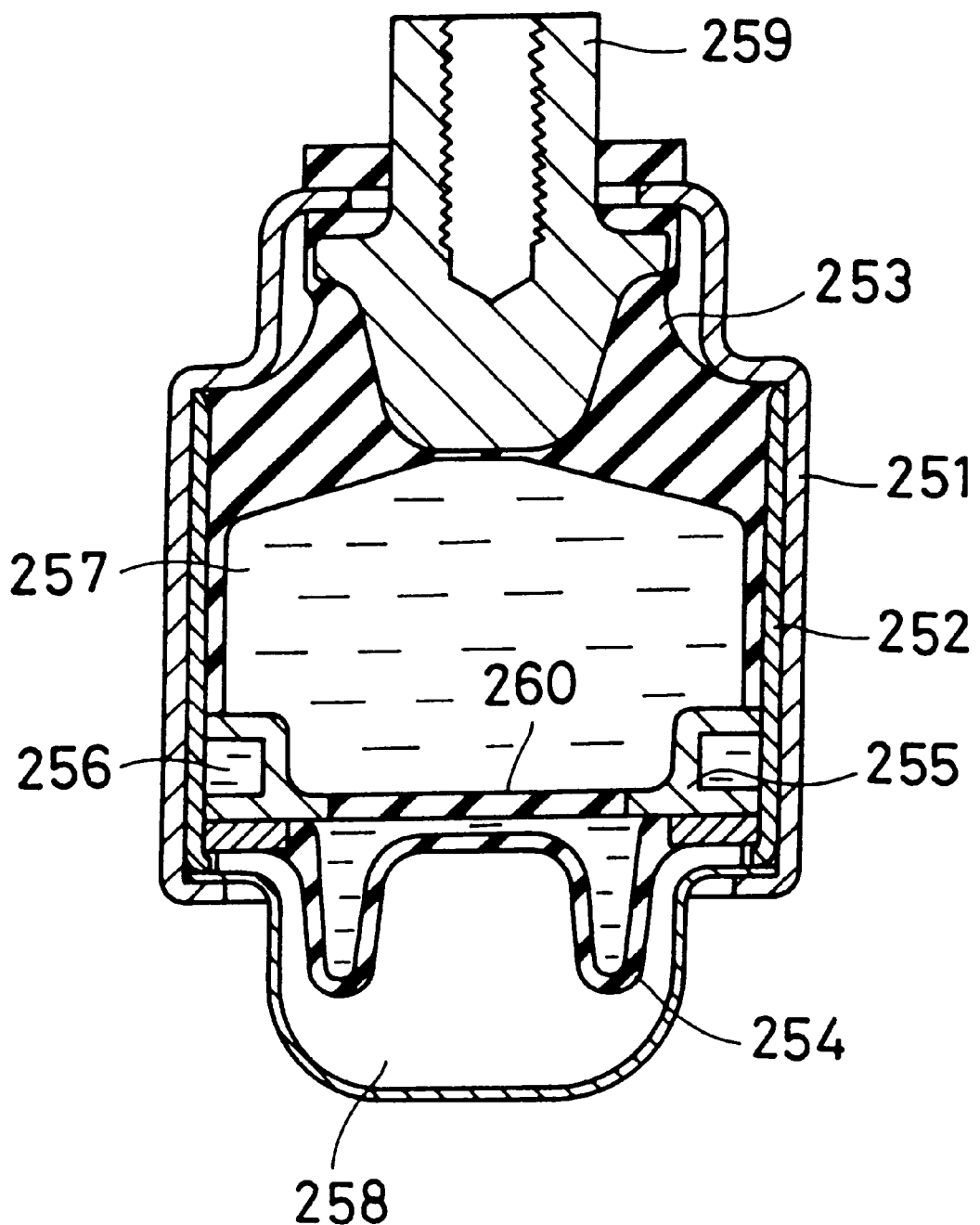
FIG. 20 is a vertical sectional view showing another example of the conventional vibration isolating mount relative to the second invention.

As is apparent from FIG. 17, in the case of the conventional vibration isolating mount (Comparative Example 2) of FIG. 19, where the rubber membrane is not provided to the peripheral wall of the first liquid chamber, the dynamic spring constant is higher as a whole, and in the case of the vibration isolating mount (Comparative Example 3) of FIG. 20, where the rubber membrane in a flat plate shape is provided at the central portion of the partition, the peak of the resonance phenomenon of the liquid occurs around 350 Hz. By contrast, according to the vibration isolating mount in FIG. 11, the peak due to the resonance phenomenon does not occur around 350 Hz and the dynamic spring constant can be reduced over a wide range in the frequency region of 100 through 500 Hz whereby reduction of muffled sound, transmitting sound or the like in high-speed running is effected.

What is claimed is:

1. A liquid filled vibration isolating mount for isolating a supported body from a supporting body, comprising:
    a rigid tubular fitting defining an interior fitting cavity, an upper opening and a lower opening;
    a vibration isolating base body formed of elastic material fitted in and closing said upper opening of said rigid tubular fitting;
    a diaphragm formed of an elastic membrane sealing said lower opening of said rigid tubular fitting;
    a partition disposed in said interior fitting cavity of said rigid tubular fitting between said vibration isolating base body and said diaphragm to divide said interior fitting cavity into a first liquid chamber and a second liquid chamber;
    said first liquid chamber having a first liquid chamber wall formed at least in part by said vibration isolating base body, said partition and said rigid tubular fitting;
    said second liquid chamber being partitioned from said first liquid chamber by said partition and having a second liquid chamber wall formed at least in part by said diaphragm and said partition;
    said partition defining an orifice communicating said first and said second liquid chambers with each other;
    upper and lower attachment fittings connected respectively to said vibration isolating base body and said rigid tubular fitting for connecting said vibration isolating base body and said rigid tubular fitting to ones of said supporting body and said supported body;

said rigid tubular fitting forming at least a portion of a side wall of the first liquid chamber wall and defining at least one side wall opening in said side wall; and an elastic membrane cup covering each of said at least one side wall opening and having a convex surface projecting into said first liquid chamber from said at least one side wall opening and said elastic membrane cup having a concave surface defining an air chamber separated from said first liquid chamber by said elastic membrane cup and extending into said interior fitting cavity.

2. The liquid filled vibration isolating mount according to claim 1, wherein said elastic membrane cup has a cup bottom wall and a cup side wall forming one of a substantially cone shape, a substantially truncated cone shape or a wedge shape.

3. The liquid filled vibration isolating mount according to claim 1, wherein said elastic membrane cup has a cup bottom wall and a cup side wall forming one of a substantially quadrangular prism shape or a substantially cylindrical shape.

4. The liquid filled vibration isolating mount according to claim 2 or 3, wherein reinforcement ribs are installed on said concave surface of said elastic membrane cup on said cup bottom wall.

5. The liquid filled vibration isolating mount according to claim 1 wherein:

said at least one side wall opening includes first and second side wall openings positioned on opposing sides of said interior fitting cavity;

said elastic membrane cup covering said first side wall opening projects to a first point inside said first liquid chamber;

said elastic membrane cup covering said second side wall opening projects to a second point inside said first liquid chamber; and a distance from said first point to said second point is greater than 0.2 times an outer diameter of said rigid tubular fitting.

6. A liquid filled vibration isolating mount for isolating a supported body from a supporting body, comprising:

a rigid tubular fitting defining an interior fitting cavity, an upper opening and a lower opening;

a vibration isolating base body formed of elastic material fitted in and closing said upper opening of said rigid tubular fitting;

a diaphragm formed of an elastic membrane sealing said lower opening of said rigid tubular fitting;

a partition disposed in said interior fitting cavity of said rigid tubular fitting between said vibration isolating base body and said diaphragm to divide said interior fitting cavity into a first liquid chamber and a second liquid chamber;

said first liquid chamber having a first liquid chamber wall formed at least in part by said vibration isolating base body, said partition and said rigid tubular fitting;

said second liquid chamber being partitioned from said first liquid chamber by said partition and having a second liquid chamber wall formed at least in part by said diaphragm and said partition;

said partition defining an orifice communicating said first and said second liquid chambers with each other;

upper and lower attachment fittings connected respectively to said vibration isolating base body and said rigid tubular fitting for connecting said vibration isolating base body and said rigid tubular fitting to ones of said supporting body and said supported body;

said rigid tubular fitting forming at least a portion of a side wall of the first liquid chamber wall and defining first and second side wall openings in said side wall opposing one another;

first and second elastic membrane cups respectively covering said first and second side wall openings and each having a convex surface projecting into said first liquid chamber from a respective one of said first and second side wall openings and said first and second elastic membrane cups each having a concave surface defining an air chamber extending into said interior fitting cavity;

said first elastic membrane cup covering said first side wall opening projecting to a first point inside said first liquid chamber;

said second elastic membrane cup covering said second side wall opening projecting to a second point inside said first liquid chamber; and a distance from said first point to said second point being greater than 0.2 times an outer diameter of said rigid tubular fitting.

7. The liquid filled vibration isolating mount according to claim 6, wherein at least one of said first and second elastic membrane cups has a cup bottom wall and a cup side wall forming one of a substantially cone shape, a substantially truncated cone shape or a wedge shape.

8. The liquid filled vibration isolating mount according to claim 6, wherein at least one of said first and second elastic membrane cups has a cup bottom wall and a cup side wall forming one of a substantially quadrangular prism shape or a substantially cylindrical shape.

9. The liquid filled vibration isolating mount according to claim 7 or 8, wherein reinforcement ribs are installed on said concave surface at said cup bottom wall.

10. A liquid filled vibration isolating mount for isolating a supported body from a supporting body, comprising:

a rigid tubular fitting defining an interior fitting cavity, an upper opening and a lower opening;

a vibration isolating base body formed of elastic material fitted in and closing said upper opening of said rigid tubular fitting;

upper and lower attachment fittings connected respectively to said vibration isolating base body and said rigid tubular fitting for connecting said vibration isolating base body and said rigid tubular fitting to ones of said supporting body and said supported body;

a diaphragm formed of an elastic membrane sealing said lower opening of said rigid tubular fitting;

a partition disposed in said interior fitting cavity of said rigid tubular fitting between said vibration isolating base body and said diaphragm to divide said interior fitting cavity into a first liquid chamber and a second liquid chamber;

said first liquid chamber having a first liquid chamber wall formed at least in part by said vibration isolating base body, said partition and said rigid tubular fitting;

said second liquid chamber being partitioned from said first liquid chamber by said partition and having a second liquid chamber wall formed at least in part by said diaphragm and said partition;

said partition defining an orifice communicating said first and said second liquid chambers with each other;

said rigid tubular fitting forming at least a portion of a side wall of the first liquid chamber wall;

an elastic membrane cup having a convex surface projecting into said first liquid chamber from said side wall; and said elastic membrane cup having a concave surface defining an air chamber separated from said first liquid chamber by said elastic membrane cup and extending into said interior fitting cavity.

11. The liquid filled vibration isolating mount according to claim 10, wherein said elastic membrane cup has a cup bottom wall and a cup side wall forming one of a substantially cone shape, a substantially truncated cone shape, a wedge shape, a substantially quadrangular prism shape or a substantially cylindrical shape.

12. The liquid filled vibration isolating mount according to claim 11, wherein reinforcement ribs are installed on said concave surface of said elastic membrane cup on said cup bottom wall.

13. The liquid filled vibration isolating mount according to claim 10, wherein said rigid tubular fitting has an opening disposed to vent the air chamber.

14. The liquid filled vibration isolating mount according to claim 10 further comprising:

said elastic membrane cup being a first elastic membrane cup;

a second elastic membrane cup having a convex surface projecting into said first liquid chamber from said side wall at a location opposite said first elastic membrane cup and said second elastic membrane cup having a concave surface defining an air chamber separated from said first liquid chamber by said elastic membrane cup and extending into said interior fitting cavity;

said first elastic membrane cup projecting to a first point inside said first liquid chamber;

said second elastic membrane cup projecting to a second point inside said first liquid chamber; and a distance from said first point to said second point being greater than 0.2 times an outer diameter of said rigid tubular fitting.

15. A liquid filled vibration isolating mount for isolating a supported body from a supporting body, comprising:

a rigid tubular fitting defining an interior fitting cavity, an upper opening and a lower opening;

a vibration isolating base body formed of elastic material fitted in and closing said upper opening of said rigid tubular fitting;

upper and lower attachment fittings connected respectively to said vibration isolating base body and said rigid tubular fitting for connecting said vibration isolating base body and said rigid tubular fitting to ones of said supporting body and said supported body;

a diaphragm formed of an elastic membrane sealing said lower opening of said rigid tubular fitting;

a partition disposed in said interior fitting cavity of said rigid tubular fitting between said vibration isolating base body and said diaphragm to divide said interior fitting cavity into a first liquid chamber and a second liquid chamber;

said first liquid chamber having a first liquid chamber wall formed at least in part by said vibration isolating base body, said partition and said rigid tubular fitting;

said second liquid chamber being partitioned from said first liquid chamber by said partition and having a second liquid chamber wall formed at least in part by said diaphragm and said partition;

said partition defining an orifice communicating said first and said second liquid chambers with each other;

said rigid tubular fitting forming at least a portion of a side wall of the first liquid chamber wall;

first and second elastic membrane cups each having a convex surface projecting into said first liquid chamber from opposing positions on said side wall;

said first and second elastic membrane cups each having a concave surface defining an air chamber extending into said interior fitting cavity;

said first elastic membrane cup projecting to a first point inside said first liquid chamber;

said second elastic membrane cup projecting to a second point inside said first liquid chamber; and a distance from said first point to said second point being greater than 0.2 times an outer diameter of said rigid tubular fitting.

16. The liquid filled vibration isolating mount according to claim 15, wherein at least one of said first and second elastic membrane cups has a cup bottom wall and a cup side wall forming one of a substantially cone shape, a substantially truncated cone shape, a wedge shape, a substantially quadrangular prism shape or a substantially cylindrical shape.

17. The liquid filled vibration isolating mount according to claim 16, wherein reinforcement ribs are installed on said concave surface at said cup bottom wall.

18. The liquid filled vibration isolating mount according to claim 15, wherein said rigid tubular fitting has first and second openings disposed respectively to vent the air chamber of said first elastic membrane cup and the air chamber of said second elastic membrane cup.

* * * * *